United States Patent [19]

Bezman

[11] Patent Number: 5,141,909
[45] Date of Patent: Aug. 25, 1992

[54] ZEOLITIC CATALYST HAVING SELECTIVITY FOR JET FUEL

[75] Inventor: Richard D. Bezman, Richmond, Calif.

[73] Assignee: Chevron Research and Technology Company, San Francisco, Calif.

[21] Appl. No.: 644,056

[22] Filed: Jan. 22, 1991

[51] Int. Cl.$^5$ ............................................. B01J 29/10
[52] U.S. Cl. ............................................................ 502/66
[58] Field of Search ........................... 502/66; 208/114

[56] References Cited

U.S. PATENT DOCUMENTS

| | | | |
|---|---|---|---|
| 3,117,075 | 1/1964 | Scott et al. | 208/111 |
| 3,178,365 | 4/1965 | Miale | 208/114 |
| 3,213,013 | 10/1965 | Arey, Jr. | 20/111 |
| 3,404,085 | 10/1968 | Hamner et al. | 208/111 |
| 3,505,208 | 4/1970 | Vaell | 208/111 |
| 3,778,365 | 12/1973 | Hamner et al. | 208/111 |
| 3,793,182 | 2/1974 | Ward | 208/111 |
| 3,816,296 | 6/1974 | Hass et al. | 208/111 |
| 4,556,646 | 12/1985 | Bezman | 502/66 |
| 4,563,434 | 1/1986 | Ward et al. | 502/66 |
| 4,689,137 | 8/1987 | Clark | 208/89 |
| 4,738,940 | 4/1988 | Dufresne et al. | 502/66 |
| 4,738,941 | 4/1988 | Dufrense et al. | 502/66 |
| 4,871,445 | 10/1989 | Koepke et al. | 208/89 |
| 4,906,353 | 3/1990 | Breckenridge et al. | 208/68 |
| 4,916,096 | 4/1990 | Hoek et al. | 502/66 |
| 4,925,546 | 5/1990 | Kukes et al. | 208/111 |
| 4,997,545 | 3/1991 | Krishna et al. | 208/114 |

FOREIGN PATENT DOCUMENTS

| | | |
|---|---|---|
| 0247678 | 12/1987 | European Pat. Off. . |
| 0247679 | 12/1987 | European Pat. Off. . |
| 219403 | 7/1924 | United Kingdom ................ 208/114 |

OTHER PUBLICATIONS

P. Dufresne, et al.; Sulficat ® and 4A-CAT Process: A New Way to Start Up Hydrocrackers; AICHE Meeting, Nov. 1989.

Primary Examiner—Carl F. Dees
Attorney, Agent, or Firm—W. Keith Turner; James W. Ambrosius

[57] ABSTRACT

A catalyst prepared from a ultra-stable Y-type zeolite having a silica/alumina ratio from about 27 to about 33 with the free acid sites passivated using a basic nitrogen-containing compound showing improved selectivity for jet fuel; a process for preparing the catalyst; and a method for producing jet fuel.

15 Claims, No Drawings

ZEOLITIC CATALYST HAVING SELECTIVITY FOR JET FUEL

FIELD OF THE INVENTION

The present invention relates to an improved zeolitic hydrocracking catalyst, its method of preparation, and its use in the hydrocracking of hydrocarbon feedstocks.

BACKGROUND OF THE INVENTION

Zeolite-containing catalysts are commonly used in the petroleum refining industry. An important application of such catalysts is their use in hydrocracking processes that convert certain low grade distillates and other feedstocks to valuable transportation fuels, particularly, high octane gasoline, diesel fuel, and premium quality jet fuel. Of special interest with regard to the present invention are those catalysts which use an ultra-stable Y-type zeolite in combination with an inorganic oxide component which serves as a binder for the zeolite. The zeolite component and inorganic oxide component are combined by various methods known to those skilled in the art to form a particulate support to which a hydrogenation component, often a noble metal, is added.

In general, increased liquid selectivity and decreased coke yield is associated with the use of an ultra-stable Y-type zeolite having a high silica content. However, the lower rate of conversion of heavy hydrocarbons associated with these catalysts is undesirable. The reason that the lower conversion of heavy hydrocarbons is undesirable is that in extinction recycle hydrocracking the heavy hydrocarbons accumulate in the recycle feed stream and depress both liquid yield and jet fuel selectivity.

Zeolite-containing catalysts containing an ultra-stable Y-type zeolite, an inorganic oxide binder, and a noble metal along with a method for preparing the catalyst are described in U.S. Pat. No. 4,556,646 issued to Bezman, the contents of which are herein incorporated by reference. The Bezman Patent also reviews other references which generally describe other zeolite-containing catalysts, their methods of preparation, and their use in hydrocracking hydrocarbon feedstocks. Similar zeolite-containing catalysts are also described in U.S. Pat. No. 4,916,096 issued to Hoek et al. The importance of the silica/alumina ratio was indirectly recognized in U.S. Pat. No. 4,738,941 issued to Dufresne et al.

Prior to their use in hydrocracking operations, catalysts as described above are generally subjected to various pretreatments which are intended to increase the efficiency of the catalyst. For example, P. Dufresne, et al. ("SULFICAT and the 4A-CAT Processes: A New Way To Start Up Hydrocrackers" presented at the 1989 ACHE annual meeting) describes a method for pretreating a zeolitic-catalyst using Ni/Mo as the hydrogenation component with a presulfiding step and a passivating step involving ammonia. U.S. Pat. Nos. 3,117,075; 3,213,013; 3,404,085; 3,505,208; 3,778,365; and 3,816,296 also teach the addition of ammonia or ammonia precursors to hydrocrackers to benefit various operational or product quality aspects of the process.

SUMMARY OF THE INVENTION

The present invention is directed to the discovery that the ratio of silica to alumina in the zeolite lattice of ultra-stable Y-type zeolites is critical in order to achieve optimum results when the catalyst is used as a jet fuel selective hydrocracking catalyst. Further it has been discovered that with the improved catalyst of the present invention when used in conjunction with a passivation start-up procedure, i.e., one involving rapid forced equilibrium of the catalyst with a basic nitrogen-containing compound, significant improvements in activity and in the conversion of heavy hydrocarbons can be achieved without increasing coke yield. The improved catalyst of the present invention combined with the passivation procedure described herein has been found to lead to significant improvements in jet fuel yield without sacrificing run length.

In contemplation of the above, the present invention is directed to an improved catalyst composition useful in hydrocracking hydrocarbon feedstocks, especially petroleum derived feedstocks, said catalyst composition containing an ultra-stable Y-type zeolite component and a hydrogenation component comprising a noble metal generally in the form of an oxide. More specifically the invention is directed to a catalyst composition comprising:

(a) a particulate support comprising an inorganic oxide component and an ultra-stable Y-type zeolite component, said zeolite component having a silica to alumina mole ratio in the crystal lattice of from about 27 to about 33 and being further characterized by its acid sites having been selectively passivated with a basic nitrogen-containing compound; and (b) a hydrogenation component consisting of at least one noble metal or a compound thereof.

The present invention is also directed to a process for preparing a catalyst comprising an inorganic oxide component, an ultra-stable Y-type zeolite component, and a noble metal component, which process comprises the steps of:

(a) forming a particulate catalyst base containing the inorganic oxide component and the ultra-stable Y-type zeolite component;

(b) depositing on the catalyst base a catalytically active amount of the noble metal component; and (c) drying and calcining the catalyst base with the deposited noble metal;

the improvement which comprises the additional steps of:

(a) selecting an ultra-stable Y-type zeolite component for use in step (a) above having a silica to alumina mole ratio in the crystal lattice of from about 27 to about 33; and (b) selectively passivating the acid sites in the zeolite component by treating the the catalyst of step (c) above with a basic nitrogen-containing compound.

The present invention is further directed to a process for cracking a hydrocarbon feedstock to produce a hydrocarbon product having improved selectivity for jet fuel which comprises:

(a) contacting a hydrocarbon with hydrogen under hydrocracking conditions in the presence of a catalyst comprising an inorganic oxide component, a hydrogenation component consisting of at least one noble metal or a compound thereof, and a zeolite component characterized as an ultra-stable Y-type zeolite having a silica to alumina mole ratio in the crystal lattice of from about 27 to about 33 and wherein the acid sites on the zeolite have been selectively passivated with a basic nitrogen-containing compound; and (b) recovering a hydrocarbon product.

DESCRIPTION OF THE PREFERRED EMBODIMENTS

The improved catalyst that is the subject of the present invention uses a particulate support that is prepared from a refractory inorganic oxide and an ultra-stable Y-type zeolite, preferably a hydrothermally dealuminated Y-type zeolite. The refractory inorganic oxide serves as a binder and generally contains alumina or silica or amorphous silica/alumina. However in some cases the inorganic oxide component may contain refractory inorganic oxides other than alumina or silica such as for example magnesia, zirconia, beryllia, titania, or mixtures of two or more of these. Other refractory materials may also be present in the binder, such as for example clay particles, so long as such materials do not adversely affect the performance characteristics of the finished catalyst.

The zeolite component of the support is an ultra-stable Y-type zeolite, preferably a hydrothermally dealuminated Y-type zeolite, that is a Y-type zeolite that has been "stabilized" by the removal of alumina from the lattice through thermal treatment of the zeolite as contrasted with other stabilization methods such as for example through ion exchange. It is an essential aspect of the present invention that the zeolite used in preparing the support have a silica to alumina mole ratio in the lattice within the range of from about 27 to about 33. The foregoing ratio refers to the silica/alumina ratio in the crystal lattice itself as contrasted with silica and alumina that might be present as amorphous material. The method for preparing ultra-stable Y-type zeolites suitable for use in the present invention are well known to those skilled in the art, and zeolites meeting the foregoing specifications are commercially available. For example, CBV-712 available from PQ zeolites B. V. (formerly Conteka) of The Netherlands has been tested and found to be suitable for the practice of the present invention and represents a preferred zeolite for preparing the catalyst of the invention. CBV-712 is a hydrothermally dealuminated Y-type zeolite that has been found to have a silica to alumina ratio in the zeolite framework of 29 as measured by Na ion exchange capacity and of 27 as measured by NMR.

In preparing the support the ratio by weight of the inorganic oxide component to the zeolite component should be within the range of 1:4 and 20:1, but generally will be between about 1:4 and about 4:1 and preferably will be within the range of from about 1:2 to about 2:1.

The support used to prepare the catalyst of the present invention is a particulate support most commonly in the form of a pellet of appropriate size, normally at least 1/32 of an inch in diameter. As used herein the term "pellet" is intended to include extrudates, prills, beads, tablets and other granular forms suitable for use in hydrocracking activities. Pellets are preferred for use in hydrocracking processes employing packed and moving beds. However, in some instances, such as for example for use in a fluidized bed, the support may be in a more finely divided form such as a powder.

The hydrogenation component of the catalyst will contain at least one noble metal or a compound thereof. As used herein, the term "noble metal" refers to the metals platinum, palladium, ruthenium, rhodium, osmium, and iridium. Particularly preferred among the noble metals is palladium and to a lesser extent platinum. While the hydrogenation component of the catalyst will contain at least one noble metal or a compound thereof, it is also possible to use combinations of two or more noble metals or their compounds, such as for example a combination of the metals platinum and palladium.

The amount of the noble metal placed on the support must be sufficient to act as an effective hydrogenation catalyst during the hydrocracking of the feedstock. Generally, the amount of noble metal on the support will be within the range of from about 0.01 weight percent to about 5 weight percent, preferably the range is from about 0.01 to about 1 weight percent. Generally adding greater than about 1 weight percent does not significantly improve the activity of the catalyst and is therefore economically disadvantageous; however amounts in excess of 1 weight percent are usually not harmful to the performance of the catalyst. In preparing the catalyst the noble metal is usually added as a compound of the selected noble metal, generally forming an aqueous solution of a salt of the noble metal. The salt of the noble metal is usually converted to the noble metal oxide during calcining of the catalyst.

The methods for preparing the support and placing the hydrogenation component on the support are well known to those skilled in the art, and it should not be necessary to discuss these procedures in detail in this disclosure. U.S. Pat. Nos. 3,793,182 (Ward) and 4,556,646 (Bezman), herein incorporated by reference, describe the general methods known in the art to prepare the support from the zeolite and the binder and to place the hydrogenation component on the support. In general, the preparation of the support involves the steps of blending the selected zeolite and the inorganic oxide binder with sufficient water to form a paste. Usually the mixture is also peptized with a strong mineral acid during this blending step. The paste is formed into pellets, as for example by extruding the paste through a die. The extrudate is usually air dried and then calcined at a high temperature. The hydrogenation component, preferably palladium, is added to the finished support by various methods known to the art, but preferably the noble metal is added by soaking the support in an impregnating solution containing a compound of the noble metal that has been buffered to a pH of between about 9 and 10. Following impregnation the catalyst is dried and calcined.

An essential aspect of the present invention is the passivation of the catalyst either prior to actually exposing the catalyst to the hydrocarbon feedstock or at the time the feedstock is initially introduced to the catalyst. In its broadest aspect any basic nitrogen-containing compound that is capable of reacting with the free acid sites on the zeolite would be suitable for carrying out the passivation step. As used herein the term basic nitrogen-containing compound refers to a compound of nitrogen having a dissociation constant of at least $10^{-6}$. In most instances the basic nitrogen-containing compound will be ammonia or a precursor of ammonia. If the catalyst is to be passivated prior to contacting the catalyst with the feedstock, the catalyst is preferably passivated with ammonia or a precursor of ammonia. Suitable precursors of ammonia that may be used to carry out the passivation step include organic amines such as tributylamine and nitrogen containing heterocyclic compounds such as pyridines and quinolines.

Rather than passivating the catalyst prior to contacting it with the hydrocarbon feedstock, the catalyst may be passivated in-situ by mixing a suitable passivating agent with the initial feedstock to be contacted to the catalyst. Suitable passivating agents for passivating the catalyst in-situ, in general include the same materials that would be suitable for the passivation step described above. In carrying out in-situ passivation of the catalyst, sufficient passivating agent must be present to selectively react with the free acid sites on the zeolite. The optimal amount of ammonia or ammonia precursor may be determined by measuring the amount of liquid and the amount of gas produced during the initial period that the hydrocarbon feedstock is contacted to the catalyst. The passivation step is complete when the amount of liquid produced is at a maximum and the amount of gas is at a minimum. Excess ammonia generally will result in a reversible loss of conversion activity, but without additionally increasing liquid product yields. The end point when the passivation is carried out prior to contacting the hydrocarbon with the catalyst may be determined experimentally. In this instance, the catalyst should be passivated with incremental amounts of ammonia or ammonia precursor and tested for hydrocracking activity. As with the in-situ procedure, the optimal amount of passivation represents that level at which the maximum amount of liquid is produced with the minimum amount of gas.

The hydrocarbon feedstocks that are suitable for use in preparing middle distillate products, including jet fuel, are mostly mineral oils, and such feedstocks usually contain aromatic and naphthenic compounds as well as normal and branched paraffins. The feedstock may consist of vacuum gas oils, deasphalted residual oils, reduced topped oils, shale oils, liquefied coal, coker distillates, flash or thermally cracked oils, atmospheric residua, and other heavy oils.

The hydrocarbonaceous feed is hydrocracked by contacting it with the catalyst of the present invention in the presence of hydrogen under standard hydrocracking reaction conditions. Hydrocracking may be carried out in one or more reaction zones and with or without initial denitrification or desulfurization. Typical hydrocracking process conditions include temperatures in the range of from about 250° C. to about 450° C., pressures in the range of about 30 to about 205 bar or more, a hydrogen recycle rate of about 100 to about 1100 SCM/KL, and an LHSV (v/v hr.) of about 0.1 to about 10.

EXAMPLES

Example 1

A catalyst base was prepared in a twin arm, kneader-type blender by mixing 395 grams of Conteka CBV-712 Y-type zeolite (88.9% solids), 182 grams of Vista Chemical Company Catapal B alumina (71.3% solids), and 232 grams of LaRoche Chemical Company Versal-250 alumina (73.0% solids). With the blender operating, the powders were sprayed first with 375 ml of water, followed by a solution of 9.2 grams of nitric acid (70.7%) diluted to 91 grams with water. After a total of about 40 minutes of mixing, an extrudable paste was produced.

The paste was extruded through a die into 0.10-inch diameter cylinders, then dried at 250° F. The dried product was calcined for 60 minutes at 1100° F. The finished catalyst base contained 54% CBV-712, 20% Catapal B, and 26% Versal. The base had a specific surface area of 467 sq. m/gram (BET method) and a particle density of 1.00 g/ml.

The base was converted into a finished catalyst containing 0.50% palladium (anhydrous basis) as follows: a solution of 7.5 grams of ammonium nitrate and 2.15 grams of tetra-amminepalladium(II) dinitrate (35.0% Pd) in 80 ml water was prepared. The pH was increased to 9.2 by the addition of ammonium hydroxide, after which it was diluted to a volume of 102 ml. A 150 gram (anhydrous basis) portion of the catalyst base was impregnated with the palladium-containing solution. After liquid addition was complete, the catalyst was allowed to stand at ambient temperature for 3 hours. The extrudate was dried in flowing air for 2 hours at 300° F., and calcined in flowing air for 1 hour at 950° F. The finished catalyst had a surface area of 451 sq. m/gram, a palladium dispersion (determined by hydrogen chemisorption at 100° C.) of 51%, and a radially-uniform palladium distribution.

Example II

A 100 ml (52 gram) portion of a catalyst prepared in a similar manner as that described in Example I above (0.28% Pd., 60% CBV-712) was charged to a hydrocracking pilot plant test reactor. The catalyst was treated in flowing hydrogen at 600° F. to reduce the palladium oxide in the catalyst to palladium metal.

A fraction of the acidity of the CBV-712 was neutralized during the initial part of the hydrocracking performance test as follows: A portion of a denitrified vacuum gas oil feed (0.3 ppmwt) was mixed with enough tributylamine to increase its nitrogen content to 10 ppmwt. This special "passivating" feed was supplied to the pilot plant until an increase in reactor temperature coupled with an increase in liquid product flow rate and a decrease in gas product flow rate showed that catalyst passivation was complete. At this time, a low-nitrogen run feed was substituted for the special "passivating" feed.

What is claimed is:

1. A catalyst composition useful in hydrocracking hydrocarbon feedstocks comprising:
    (a) a particulate support comprising an inorganic oxide component and an ultra-stable Y-type zeolite component, said zeolite component having a silica to alumina mole ratio in the crystal lattice of from about 27 to about 33 and being further characterized by its acid sites having been selectively passivated with a basic nitrogen compound; and
    (b) a hydrogenation component consisting of at least one noble metal or a compound thereof.

2. The catalyst composition of claim 1 wherein the ultra stable Y-type zeolite is a hydrothermally dealuminated Y-type zeolite.

3. The catalyst composition of claim 2 wherein the inorganic oxide support is alumina.

4. The catalyst composition of claim 3 wherein the ratio by weight of the inorganic oxide component to the zeolite component is between about 1:2 and about 2:1.

5. The catalyst composition of claim 2 wherein the hydrogenation component contains palladium or a compound of palladium.

6. The catalyst composition of claim 5 wherein the palladium is present in the amount of from about 0.01 to about 5 weight percent.

7. The catalyst composition of claim 6 wherein the palladium is present in the range of from about 0.01 to about 1 weight percent.

8. The catalyst composition as in any one of claims 2-7, in which the basic nitrogen-containing compound is ammonia or a precursor of ammonia.

9. A process for preparing a catalyst comprising an inorganic oxide component, an ultra-stable Y-type zeolite component, and a noble metal component, which process comprises the steps of:

(a) forming a particulate catalyst base containing the inorganic oxide component and the ultra-stable Y-type zeolite component;

(b) depositing on the catalyst base a catalytically active amount of the noble metal component;

(c) drying and calcining the catalyst base with the deposited noble metal; and the improvement which comprises the additional steps of:

(a) selecting an ultra-stable Y-type zeolite component for use in step (a) above having a silica to alumina mole ratio in the crystal lattice of from about 27 to about 33; and (b) selectively passivating the acid sites in the zeolite component by treating the the catalyst of step (c) above with a basic nitrogen-containing compound.

10. The process of claim 9 wherein the zeolite selected is a hydrothermally dealuminated Y-type zeolite.

11. The process of claim 9 wherein the basic nitrogen-containing compound is ammonia or a precursor of ammonia.

12. The process of claim 11 wherein the noble metal deposited on the catalyst base is palladium or a compound of palladium.

13. The process of claim 11 wherein the passivating step is carried out in-situ by adding the ammonia or ammonia precursor to the initial feed contacted to the catalyst.

14. The process of claim 13 wherein the amount of ammonia or ammonia precursor is controlled to maximize the amount of liquid produced in the hydrocracking operation.

15. The process of claim 11 wherein the passivating step is carried out prior to contacting the catalyst with the hydrocarbon feedstock by passivating the catalyst with sufficient ammonia or an ammonia precursor to maximize the production of liquid in the hydrocracking operation.

* * * * *